United States Patent
Lloyd et al.

(10) Patent No.: US 10,287,022 B2
(45) Date of Patent: May 14, 2019

(54) PRESSURE ACTIVATED RELEASE FOR DEPLOYMENT OF SURFACE, AERIAL AND SUBSEA PAYLOADS

(71) Applicant: SPAWAR Systems Center Pacific, San Diego, CA (US)

(72) Inventors: Jeffrey M. Lloyd, San Diego, CA (US); Brandon J. Wiedemeier, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 303 days.

(21) Appl. No.: 15/250,418

(22) Filed: Aug. 29, 2016

(65) Prior Publication Data

US 2018/0057166 A1    Mar. 1, 2018

(51) Int. Cl.
*B64D 17/38* (2006.01)
*H01H 35/26* (2006.01)

(52) U.S. Cl.
CPC ............ *B64D 17/38* (2013.01); *H01H 35/26* (2013.01)

(58) Field of Classification Search
CPC ... B64D 1/00; B64D 1/02; B64D 1/08; B64D 1/12; B64D 17/62; B64D 17/70
USPC .................. 244/136, 137.1, 137.3, 137.4
See application file for complete search history.

(56) References Cited

U.S. PATENT DOCUMENTS

| | | | | |
|---|---|---|---|---|
| 2,470,783 A * | 5/1949 | Mead | ...................... | B64C 35/00 116/210 |
| 2,907,843 A * | 10/1959 | Thorness | .................. | B64B 1/58 200/81 R |
| 3,282,539 A * | 11/1966 | Wiant | ...................... | B64G 1/62 102/348 |
| 3,921,120 A * | 11/1975 | Widenhofer | .......... | B63B 22/003 116/209 |
| 3,998,408 A * | 12/1976 | Caldwell, Jr. | ......... | B63B 22/003 244/138 R |
| 4,208,738 A * | 6/1980 | Lamborn | ............. | G10K 11/008 367/153 |
| 4,247,143 A | 1/1981 | Putman | | |
| 4,631,956 A * | 12/1986 | Walden | .................... | B64D 1/02 441/25 |
| 4,635,739 A | 1/1987 | Foley et al. | | |
| 5,040,748 A | 8/1991 | Torre et al. | | |
| 5,069,580 A | 12/1991 | Herwig et al. | | |
| 6,059,234 A | 5/2000 | Mueller et al. | | |

(Continued)

FOREIGN PATENT DOCUMENTS

EP 2 236 416 A2 10/2010
WO WO/2007/042783 4/2007

*Primary Examiner* — Richard R. Green
*Assistant Examiner* — Brady W Frazier
(74) *Attorney, Agent, or Firm* — Naval Information Warfare Center Pacific; Kyle Eppele

(57) ABSTRACT

A pressure activated release system and method are disclosed for deployment of surface, aerial and subsea payloads. The system and method include a payload release switch that is activated, without human intervention, by a pressure differential. The system and method also includes a payload release mechanism having an unreleased configuration at pressures below a specified pressure. The release mechanism has a released configuration at pressures above the specified pressure. The switch causes the release mechanism to move from the unreleased configuration to the released configuration.

19 Claims, 7 Drawing Sheets

(56) References Cited

U.S. PATENT DOCUMENTS

| | | |
|---|---|---|
| 6,086,020 A | 6/2000 | Machiussi |
| 6,808,144 B1 | 10/2004 | Nicolai et al. |
| 8,162,263 B2 | 4/2012 | Wong et al. |
| 8,240,602 B1 | 8/2012 | Lloyd et al. |
| 8,963,362 B2 | 2/2015 | Sia |
| 9,045,971 B2 | 6/2015 | McKay |
| 9,174,733 B1 | 11/2015 | Burgess et al. |
| 2003/0116680 A1 | 6/2003 | Wang |
| 2004/0059476 A1 | 3/2004 | Nichols |
| 2006/0005759 A1 | 1/2006 | Harland-White |
| 2006/0097113 A1 | 5/2006 | Landsberg |
| 2010/0243815 A1 | 9/2010 | Wong et al. |

\* cited by examiner

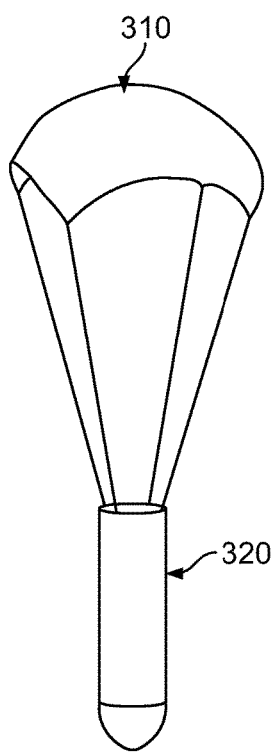
FIG. 3A
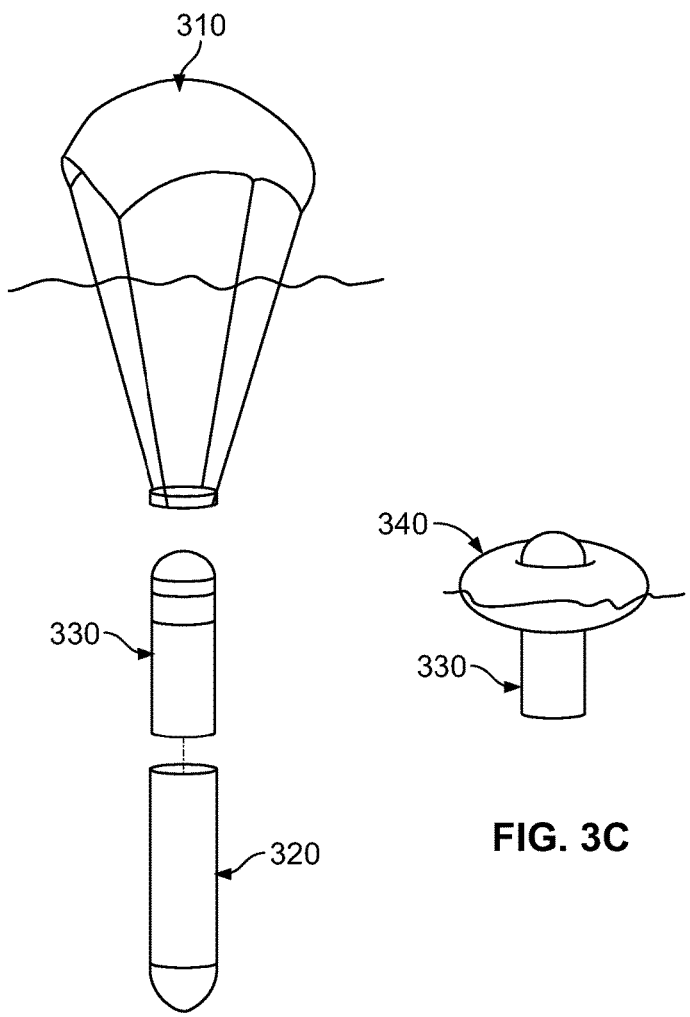
FIG. 3C
FIG. 3B

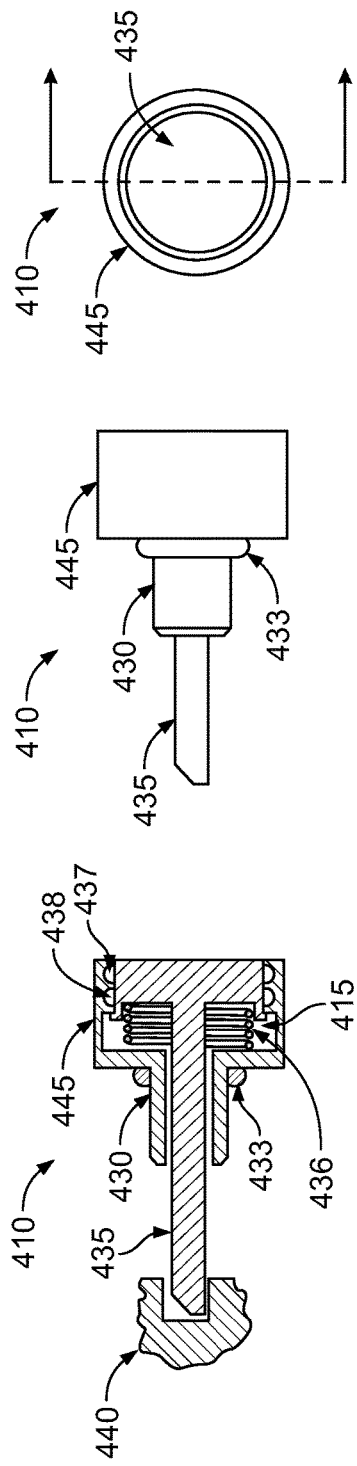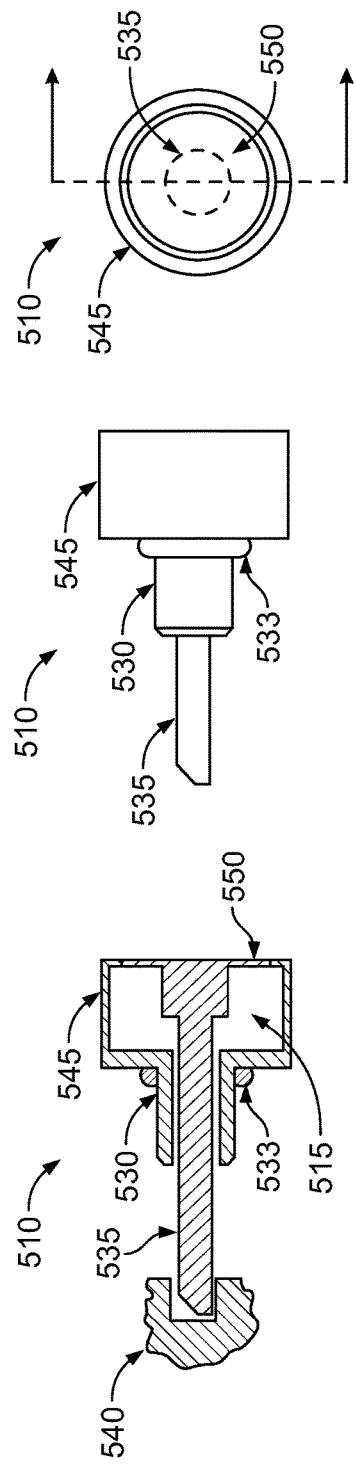

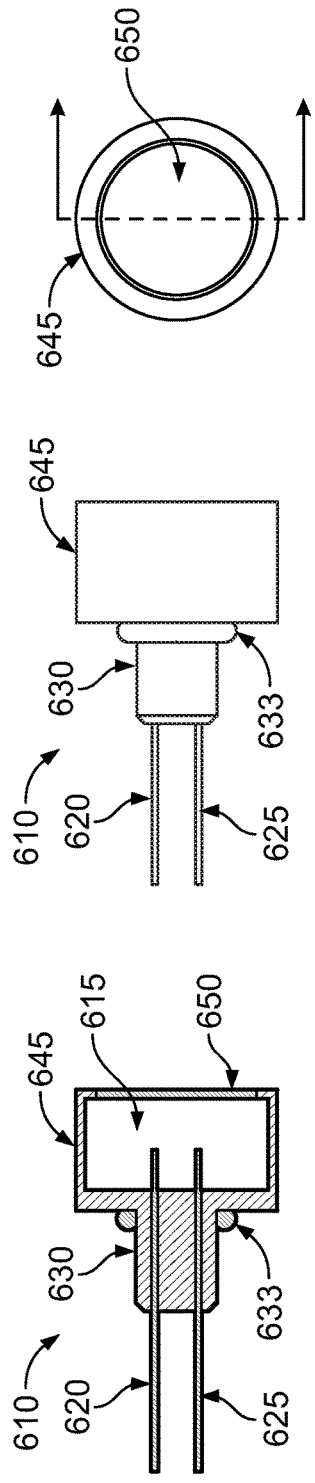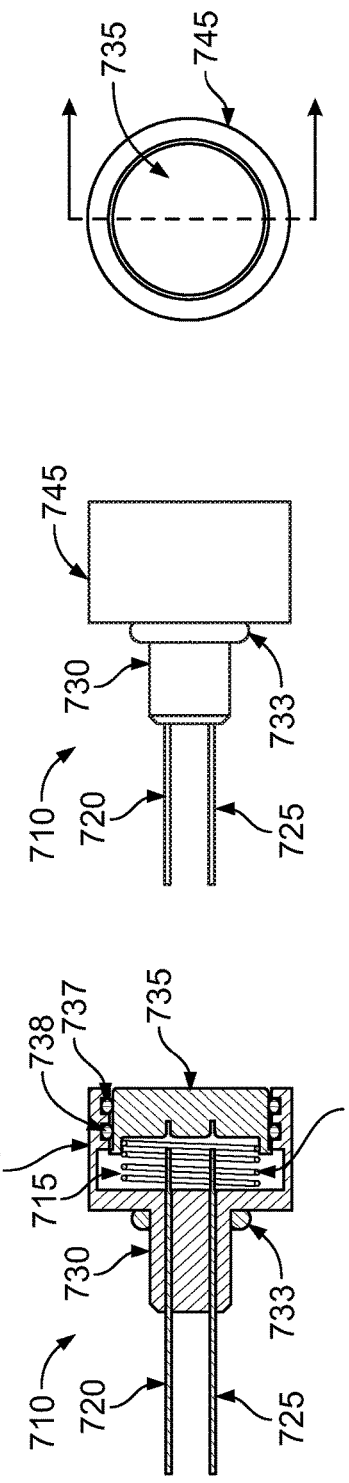

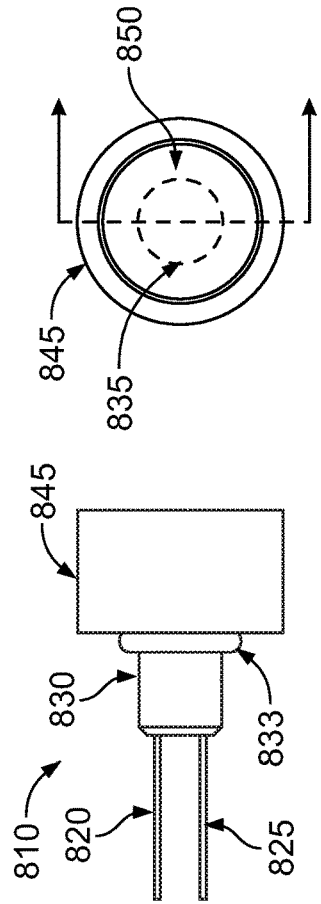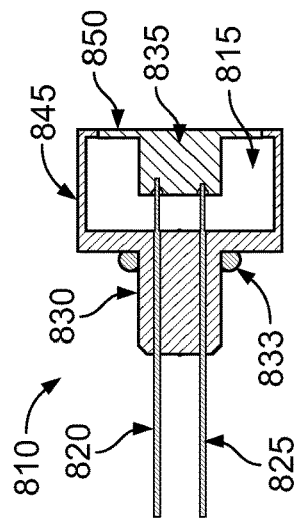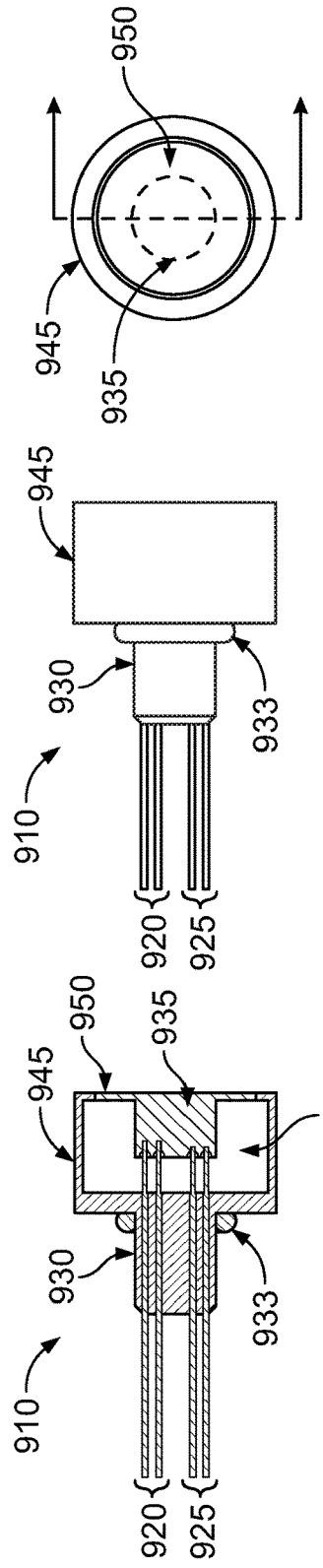

PRESSURE ACTIVATED RELEASE FOR DEPLOYMENT OF SURFACE, AERIAL AND SUBSEA PAYLOADS

STATEMENT OF GOVERNMENT INTEREST FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 102,564.

BACKGROUND OF THE INVENTION

Field of Invention

This disclosure relates to payloads, and more particularly, releases for deployment of payloads.

Description of Related Art

Design requirements continue to limit the scale, expense and power requirements of devices and subsystems used with surface-based, aerial, and subsea payloads. Pressure sensing devices are one example of a type of device that is used with these payloads. It may be desirable to create pressure sensing devices for use with payloads that are smaller, less expensive, resource-efficient, and that serve multiple purposes.

Typical pressure sensing devices are generalized to sense a wide range of pressures. These pressure sensing devices may be capable of recording or sending signals to give accurate readings of the air or subsea environment. Such readings may include metrics such as pressure and temperature. These pressure sensors may work well for a wide variety of applications. Moreover, the sensors can be adapted with resources including programmable computers and control circuitry.

However, for these pressure sensing devices, a computer may be required to be built into the circuit to give the release signal. As a consequence, these sensors may be expensive, large, and may be inefficient in terms of size, power, weight and design effort. Additionally, they may require standby power which limits their mission time.

Other pressure sensing devices may require human intervention to set up, program or read. The requirement for human intervention may be unfeasible when these pressure sensing devices are used with unmanned vehicles and vessels.

Release systems may be used to deploy payloads. In order to reduce the scale and expense of payloads, it may be desirable to incorporate the functionality of the pressure sensing device into a release system. Thus, there is a need for a pressure activated release system for deployment of payloads that is relatively small and inexpensive. There is still further a need for pressure activated release system for deployment of payloads that does not require human intervention to set up, program or read so that they are suitable for use with unmanned vehicles and vessels. For payload applications, power resources may be limited. Accordingly, there is yet further a need for a pressure release system that is resource efficient.

BRIEF SUMMARY OF INVENTION

The present disclosure addresses the needs noted above by providing a pressure activated release system and method for deployment of payloads.

In accordance with one embodiment of the present disclosure, a pressure activated release system is provided for deployment of such payloads and associated payload assemblies. The system comprises at least one payload release switch configured to be activated, without human intervention, by a pressure differential. The system further comprises at least one payload release mechanism having an unreleased configuration at pressures below a specified pressure. The payload release mechanism has a released configuration at pressures above the specified pressure. The payload release switch is configured to cause the payload release mechanism to move from the unreleased configuration to the released configuration. The release system is capable of deploying surface, aerial and subsea payload assemblies that include payloads.

These, as well as other objects, features and benefits will now become clear from a review of the following detailed description, the illustrative embodiments, and the accompanying drawings.

BRIEF DESCRIPTION OF DRAWINGS

FIGS. 3A, 3B and 3C are illustrations of the various stages of an aerial deployment of a payload in accordance with one embodiment of the present disclosure.

FIGS. 4A, 4B and 4C illustrate a potential embodiment of a resettable spring plunger that may be incorporated into the pressure activated release system in accordance with the present disclosure.

FIGS. 5A, 5B and 5C illustrate a potential embodiment of a resettable moving diaphragm that may be incorporated into the pressure activated release system in accordance with the present disclosure.

FIGS. 6A, 6B and 6C illustrate a shear plate embodiment of an electronic switch that may be incorporated into the pressure activated release system in accordance with the present disclosure.

FIGS. 7A, 7B and 7C illustrate a resettable spring plunger embodiment of an electronic switch that may be incorporated into the pressure activated release system in accordance with the present disclosure.

FIGS. 8A, 8B and 8C illustrate a resettable moving diaphragm embodiment of an electronic switch that may be incorporated into the pressure activated release system in accordance with the present disclosure.

FIGS. 9A, 9B and 9C illustrate a multiple-contact embodiment of an electronic switch that may be incorporated into the pressure activated release system in accordance with the present disclosure.

DETAILED DESCRIPTION OF THE INVENTION

Figure 1:
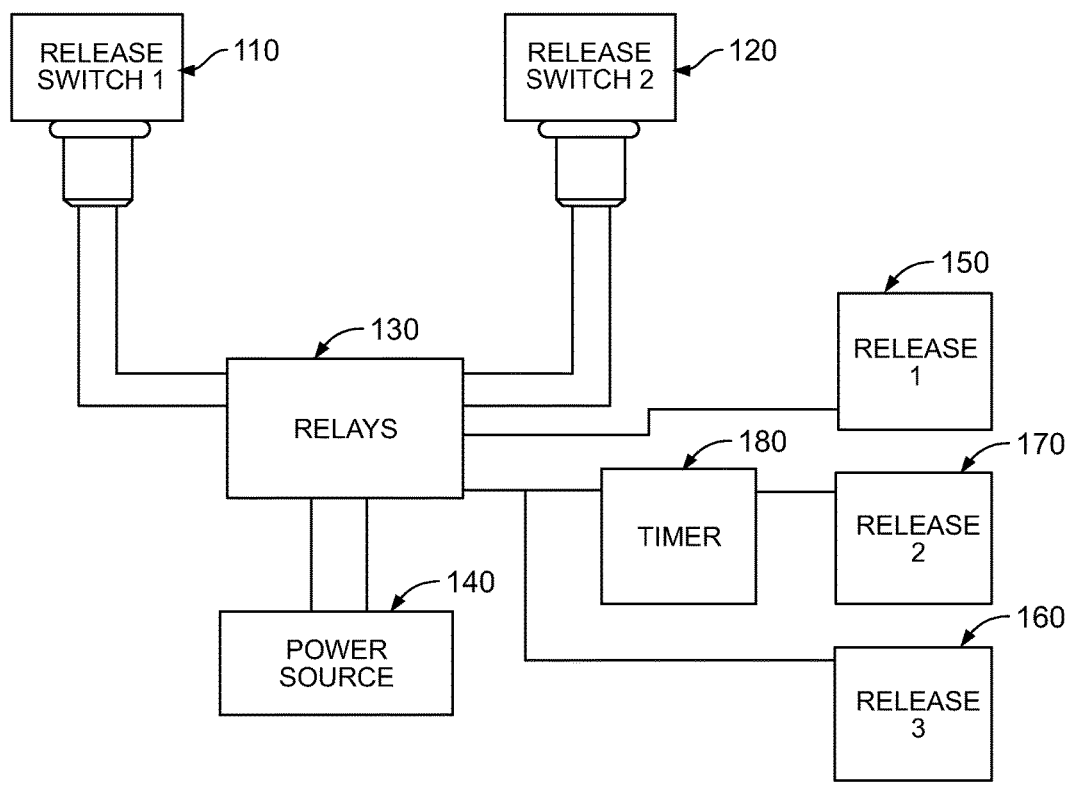
FIG. 1 is a diagram of system level architecture for an electronic pressure activated release system for deployment of payloads in accordance with one embodiment of the present disclosure.

A pressure activated release system and method for deployment of payload assemblies is described herein. The system and method incorporate a pressure-activated payload release mechanism that is triggered by a payload release switch. The payload release switch triggers the payload release mechanism according to a pressure differential. The payload release mechanism and the payload release switch may be incorporated into a larger payload assembly that may be used to transport the payload from location to location in different environments, including from a surface, to air, to a subsea location. When triggered, the release mechanism may release, deploy or separate one part of the payload assembly from another part of the payload assembly at a specified altitude or depth.

The release mechanism that is a part of the present release system may be in an unreleased configuration at all pressures below a certain pressure. On the other hand, the release mechanism may be in a released configuration when that pressure is exceeded. In this manner, the release mechanism may use the pressure differential in air between at-altitude pressure and sea-level pressure. The release system may also be triggered by other pressure differentials, e.g., the difference between surface pressure at sea level and the pressure at a specified depth. The switch causes the release mechanism to move from the unreleased configuration to the released configuration. The switch is activated, without human intervention, by a pressure differential.

Payloads and associated payload assemblies may be deployed using the present release system and method. As noted above, a payload may be incorporated into a larger payload assembly. A payload assembly may include a number of different components, e.g., a parachute, payload, ballast, and shock tube for containment/protection of the payload. The payload release system and method may be used to release any part of a payload assembly from any other part of the payload assembly, at a prescribed time delay or pressure differential. For example, in a first release step, above sea level, the payload assembly—here, a parachute, payload, ballast, and shock tube—could be released from a vessel on which it has been loaded. The parachute could open and allow the descent of the payload assembly to a specified altitude. In a second release step, above sea level, the parachute could be separated from the remainder of the payload assembly. In a third release step, at a subsea level, the payload could be separated from the shock tube and ballast. In a fourth release step, the shock tube could be separated from the ballast. Each of these releases could be performed by multiple release mechanisms that may be triggered by multiple switches at different pressures, altitudes and/or depths.

The payload release system and method of the present disclosure may include a release mechanism that is completely mechanical and passive. Alternatively, a release mechanism of the presently described release system may be triggered through electrical means. Additionally, there may be another switch that activates in reverse to serve as a one-time arming switch such that the release mechanism does not deploy unless it is first exposed to lower pressure, such as after take-off. The present system and method exploit the natural physics of the environment. As a result, the present release system and method do not require complicated, expensive sensors and power supplies.

The types of payload assemblies suitable for use with the current system and method include surface-based, aerial and subsea payload assemblies that include payloads. A surface payload assembly may be defined as a payload assembly that rests on a surface that is above sea level. The surface may include, but is not limited to, the ground, the water's surface, or the deck of a ship.

An aerial payload assembly may be defined as a payload assembly with an incorporated payload that is airborne, whether moving through air, or suspended in air, or otherwise airborne. In the case of aerial payload assemblies, the pressure activated release system and method described herein may be used to separate a parachute and associated payload from a vehicle so that the payload may be deployed. At times, it may be useful for the payload to be deployed from the shock tube simultaneously with the separation of the parachute from the payload. This type of simultaneous deployment may be particularly useful in aerial deployments where the parachute and payload have descended to reach the surface of a body of water. After the parachute and payload hit the water's surface, a first release mechanism may operate to separate the parachute from the payload. A second release mechanism may operate to separate the payload from the shock tube either at that time or later by timer or after it has moved to a higher pressure. Alternatively, the payload may be deployed after separation of the parachute from the payload. The system and method described herein may also be used to deploy subsea payloads. A subsea payload may be defined as a payload that is submerged beneath the surface of a body of water, including but not limited to an ocean, a sea, a lake or a man-made body of water.

Referring now to FIG. 1, illustrated is a diagram of the possible system level architecture for an electrically activated pressure activated release system for deployment of payloads in accordance with one embodiment of the present disclosure that takes advantage of the switches in a more complex scenario. As will be shown later, e.g., in FIGS. 6A-8C, variants of the electrically conducting switches can be used with the pressure activated release system and method of the present disclosure. As shown in FIG. 1, release switches 110, 120 or other payload release switches may be activated by a pressure differential by making contact after mechanically moving from an open position to a closed position. One of switches 110, 120 can be omitted if a single pressure differential is sufficient. Alternatively, release switches 110, 120 may be activated by differential pressure directly, e.g., through the deflection of the switch, as opposed to the opening and closing of the switch. The payload release system may be used to release any part of a payload assembly from any other part of a payload assembly. For example, a payload assembly may include a parachute, and a payload. Release switch 110 may be used to release the parachute from a vehicle upon which the parachute is mounted, while release switch 120 may be used to trigger the release of the parachute from the payload and the payload from a shock tube.

In this electronic embodiment of the release system, the relays 130 may receive a signal from either of switches 110, 120. As a result, the relays 130 may close. The relays 130 can be omitted if the switches 110, 120 are capable of handling the power source 140. Alternatively, the present release system may operate through a relay 130 or series of relays and timers, thus allowing for timed release or trigger of various aspects or different components of the acted upon payload and/or payload assembly. When the switch activates, the relays 130 close, and they may draw power from power source 140. The release mechanisms 150, 160 may thereby be energized. Release 170 may be energized when the timer 180 permits. The timer 180 may be omitted if the release mechanisms 150, 160, 170 are desired to be released simultaneously. One or more of the release mechanisms 150, 160, 170 may be omitted if all desired parts of a payload assembly can be released with fewer mechanisms. Release mechanisms 160, 170 may operate from the same switch signal to release multiple parts of a payload assembly. For example, switch 120 could trigger the release of a payload from a parachute, and later, a timed release of the payload from a shock tube through use of timer 180. Switch 110 could have earlier triggered the release of the parachute from a vehicle upon which the payload assembly (including the parachute) was mounted. System-specific action may be accomplished by release mechanisms 150, 160 and 170 or other payload release mechanisms. Alternatively as described above, the present release system and method can be much simpler and may operate without a relay such that it can be made to accommodate the power of the system to facilitate payload release.

Power source 140 may be a battery. Dissimilar metals may have a voltage when they encounter sea water, thus providing a signal for a relay. Power source 140 may also be a chemical battery that provides power based on a chemical reaction. Additionally, the release may be performed with other chemical reactions such as those that create an expanding gas to push the payload from its launch/shock tube.

The release is passively powered, and electrically triggered. This electronic embodiment can be made to be self-contained, compact, inexpensive, lightweight, robust and accurate as described above. Alternate systems may require separate CPU boards, significant battery packs for standby power, and separate sensors which are subject to reliability issues after long-term storage or long missions.

In a simpler embodiment of an electronic version of the release system (not shown), the system may include a single payload release switch such as one of switches 110, 120, and a single payload release mechanism, such as one of releases 150, 160, 170. The switch may be normally open. The switch may trigger closed once it senses a set differential pressure, such as at a specified depth below sea level. When it closes, the switch may activate the release mechanism through a relay with battery power. A battery and/or relay may be included in order to provide power to the release system. The simplest embodiment would not require a relay, and system power could flow through the switch.

In other embodiments, as described in FIGS. 4A-5C, the release mechanism that is a part of the release system described herein may be purely mechanical. Either embodiment of this device, mechanical or electrical, may be self-contained such that it does not need external power to activate the payload release switch or payload release mechanism, nor does the switch or release need a wakeup signal to function.

Figure 2A:
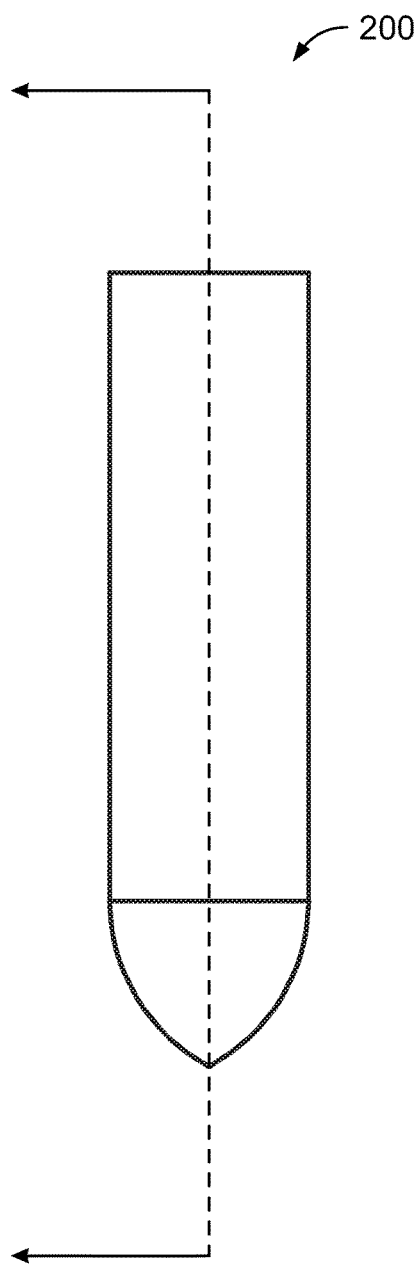
FIGS. 2A and 2B are illustrations of a payload assembly for deployment of a payload in accordance with one embodiment of the present disclosure.

Referring now to FIG. 2A, illustrated is a payload assembly 200 for deployment of a payload in accordance with one embodiment of the present disclosure. The payload assembly 200 may be stored on a vehicle or vessel. The payload assembly 200 may be mounted on, attached to, or otherwise connected to a vehicle, such as an unmanned aerial vehicle (UAV) or unmanned underwater vehicle (UUV). Alternatively, this payload assembly 200 may be mounted on, attached to, or otherwise connected to a vessel such as a surface ship, a boat, or a submarine.

Figure 2B:
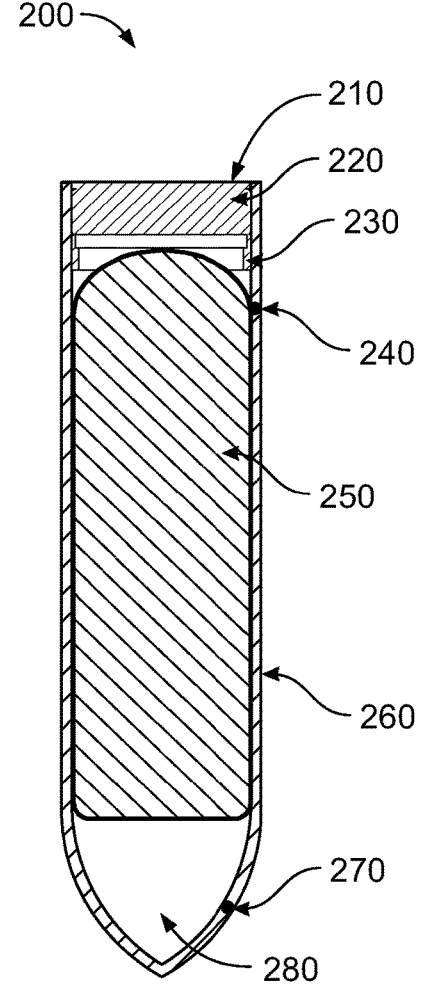

Referring now to FIG. 2B, illustrated is a cross-sectional view of the payload assembly of FIG. 2A. Shown in FIG. 2B is a parachute release plate 210 or other aerial release device suitable for releasing the payload from a vehicle or vessel. The payload could be released into the air as an aerial payload.

The parachute release plate 210 may hold the parachute or other aerial drag device in place until it is launched from an aerial vehicle. The parachute release plate 210 may not be necessary for a surface ship. Parachute 220 may be detached from a vehicle or vessel by pulling a pin from a slot. Parachute 220 or other aerial drag device may be released as deployed from an aerial vehicle such as an airplane, a helicopter or an unmanned aerial vehicle. Alternatively, parachute 220 may also be released at a specified altitude. Parachute 220 may delay the descent of the payload assembly 200.

In a purely mechanical embodiment, parachute 220 may connect to a payload release mechanism 230. In this embodiment, the parachute release switch 240 is a payload release switch. The payload release mechanism 230, when activated by the parachute pressure release switch 240, may be used to release the payload 250 at a specified depth or altitude. The payload 250 and associated parachute 220 may be released at different times. For example, first, the parachute 220 that forms a part of the payload assembly 200 may be released at a specified altitude or water depth as described below.

Parachute pressure release switch 240 or other aerial pressure/payload release switch may be activated when a specified pressure is achieved. Parachute pressure release switch 240 and other pressure release switches may take on any of the forms described later herein in FIGS. 4A-9C. The parachute pressure release switch 240, along with payload release mechanism 230, may be designed to cause the separation of a parachute from payload 250. Payload 250 may be dropped by vehicle or ejected from a vessel that incorporates this payload assembly 200.

Then, the payload 250 may be released from the parachute. Alternatively, the payload assembly 200 and parachute 220 may be simultaneously released, e.g., when at the surface of a body of water, or reaching a specified depth. Alternatively, the parachute 220 may be released first and the payload 250 may be released from the shock tube 260 based on a timer delay or increased ambient pressure.

Payload 250 may be disposed inside a shock isolation tube. The payload 250 may take on a multitude of forms. Payload 250 may be an active sensor or other material that acts as the final payload. Payload 250 may be small enough to fit within the shock isolation tube 260. Payload 250 may be a temperature sensor that records temperature as it descends via air or water. Payload 250 could also be something that releases a marker of some kind. Payload 250 may itself be an unmanned aerial or underwater vehicle. Payload 250 may include supply items e.g., batteries or food. Payload 250 may be anything suitable to be released by the payload release mechanism and activated by the payload release switch described herein.

The release of parachute 220 from the payload 250 may be simultaneous with the release of the payload 250 from the shock isolation tube 260. Shock isolation tube 260 may provide protection for the payload 250, until the payload 250 is released or extracted from tube 260. In this embodiment, payload pressure release switch 270 is a payload release switch. Payload pressure release switch 270 or other payload release switch may be used to release the payload from the shock isolation tube 260. Payload pressure release switch 270 may take on any of the forms of switches described later herein in FIGS. 4A-9C. Shock tube electronics and ballast 280 may include electronics used to power the shock tube 260. For example, the shock tube electronics and ballast 280 may include a power source, relay timers or anything needed to support an electronic shock tube. The shock tube electronics and ballast 280 may also include items that aid in the operation or storage of the shock tube 260. For example, the ballast portion of the shock tube electronics and ballast 280 may be used to orient the payload 250 before it releases, or after it reaches the surface. It may also be used to cause the payload to quickly descend to a certain altitude or subsea depth.

A payload release mechanism and payload release switch may be used to release any part of payload assembly 200 from any other part of payload assembly 200.

Referring now to FIGS. 3A, 3B and 3C, illustrated are the various stages of deployment of a payload assembly in accordance with one embodiment of the present disclosure. The release system and method of the present disclosure may easily convert surface-deployed payloads into aerial-deployed payloads through the use of a parachute and pressure release. The aerial payload may become a subsea payload if it descends so that the payload is submerged in water. The release system described herein may be used for subsea-deployed payloads that require a depth-sensitive release. Many such subsea payloads are small and lightweight for portability.

In accordance with the illustration of FIG. 3A, illustrated is a first parachute stage for aerial-to-subsea deployment of a payload assembly in accordance with one embodiment of the present disclosure. The parachute 310 may be deployed in an aerial manner when the payload (not shown) is dropped to the earth's surface or other lower altitude. In lieu of a parachute, another device that produces aerial drag may be used. For example, a kite or balloon may be deployed along with the payload in order to slow the descent of the payload.

Payload is disposed within shock isolation tube 320. The payload may be small enough to fit within the shock isolation tube 320. Alternatively, the payload may be larger. The shock isolation tube 320 may descend until it hits the water and sinks to a specified depth.

Referring now to FIG. 3B, illustrated is a separation stage for the parachute, payload and shock tube in accordance with one embodiment of the present disclosure. As shown in the separation stage, two separations may occur. The shock tube 320 may hold payload 330 until payload 330 is released or extracted at a specified depth. Then the parachute 310 may detach from the payload 330 and/or shock tube 320, after which the parachute 310 may scuttle or float away. The payload 330, previously an aerial payload, is now a subsea payload in this FIG. 3B.

Referring now to FIG. 3C, illustrated is a float stage for the payload in accordance with one embodiment of the present disclosure. In the float stage, the payload 330 may then descend to the sea floor and await further signal. Alternatively, there may be a timed release of the payload 330, if the release mechanism is subject to a timer delay. As yet another alternative, a buoy collar 340 may be inflated in order to create a surface following buoy. Here, the payload 330 is partially submerged, with its top extending above the water's surface.

The release mechanism may take several forms. FIGS. 4A-5C illustrate payload release mechanisms, and payload release switches that are incorporated into the payload release mechanisms. Referring now to FIG. 4A, illustrated is a cross-sectional view of a mechanical embodiment for a resettable spring plunger 410 as part of the release. This resettable embodiment may permit the release to be automatically resettable if a payload requires the signal every time it passes a certain depth.

The release mechanism 410 includes a moving diaphragm 415, plunger housing 430, O-rings 433 around plunger housing, and plunger 435. Plunger 435 may slide on O-rings 433 or other seals against the pressure of spring 436. A spring 436 is disposed within the moving diaphragm 415. Additional O-rings 437, 438 create a seal against the pressure of plunger 435.

As the differential pressure increases, the surface area of the release is acted on by the pressure so that the proximal end of plunger 435 makes contact with a detent 440, thus unhooking the trigger release. Plunger housing 430 and release housing 445 are also shown. Referring now to FIG. 4B, illustrated is a side view of the resettable spring plunger 410 of FIG. 4A in accordance with the present disclosure. Plunger 435 protrudes through an opening in shaft housing 430 which is adjacent to release housing 445. Plunger 435 may slide on O-rings 433. FIG. 4C is a rear view of the resettable spring plunger 410 that shows the back of release housing 445. The distal end of plunger 435 is also shown.

In the case of the mechanically-activated release as shown in this embodiment, the switch may be incorporated into the release mechanism itself. In the fully mechanical configuration as in FIGS. 4A-4C, the switching action may be performed with proximal end of plunger 435 acting directly on a lever or detent, 440 rather than an electrical signal. Spring force from spring 436, which is disposed within the release mechanism 410, may activate the payload release mechanism 410 to release a payload. In this and other fully mechanical embodiments, no powered relay and solenoid would be needed (as they were in the electronic embodiment). The depth at which the payload release mechanism 410 and/or associated plunger 435 are activated can be set through design. The design depth can be either inherent in the geometry, or the design depth can be set based on spring or diaphragm selection, or friction of a sliding piston.

Referring now to FIG. 5A illustrated is a cross-sectional view of a resettable moving diaphragm that forms a part of the pressure activated release in accordance with one embodiment of the present disclosure. As shown in FIG. 5A, the moving diaphragm release mechanism 510 has a moving diaphragm 515 that depresses with differential pressure. Shaft housing 530 surrounds plunger 535. The moving diaphragm 515 may be self-sealed. In lieu of being self-sealed, the moving diaphragm 515 may communicate with the static pressure of a payload. The payload volume may communicate with the space denoted by diaphragm 515. The switch is incorporated into the release mechanism. Plunger 535 acts as a switch, and is a spring-less sliding piston or shaft. Plunger 535 may slide on O-rings 533 or other seals. Plunger 535 protrudes from shaft housing 535. As the differential pressure increases, the surface area of the release is acted on by the pressure. As a result, the proximal end of plunger 535 makes contact with lever or detent 540 that could unhook the trigger release or slide a pin out of place. The pin could slide from a slot or other device. The diaphragm 515 is disposed between plunger 535 and release housing 545. Release housing 545 is shown next to shaft housing 535. Rear wall 550 is a section fills up the space between release housing 545 and plunger 535 to enclose diaphragm 515.

FIG. 5B is a side view of the moving diaphragm embodiment of the release mechanism of FIG. 5A. As shown in FIG. 5B, the release mechanism 510 has a plunger 535 which slides on O-rings 533. Plunger 535 is a switch in the form of a shaft that protrudes from shaft housing 530. Shaft housing is adjacent to release housing 545. FIG. 5C is a back view of the moving diaphragm embodiment of the release mechanism 510 of FIGS. 5A and 5B. Diaphragm side walls 545 or housing can be seen from this back view. A rear wall 550 fills the area between release housing 545 and plunger 535 to enclose diaphragm 515. The distal end of plunger 535 is also shown.

The payload release switch described in the present disclosure may take on various electronic embodiments. FIGS. 6A-9C, inclusive, illustrate various electronic switch embodiments for the pressure activated release in accordance with the present disclosure.

Referring now to FIG. 6A, illustrated is a cross sectional view of a shear plate 610 that acts as a pressure activated electronic switch in accordance with one embodiment of the present disclosure. When the switch 610 reaches a predetermined depth, the shear plate 610 mechanically separates due to mechanical shear forces from the differential pressure. The switch cavity is disposed inside diaphragm 615, which ruptures when the sea water rushes in. As a result, sea water may rush in and flood the switch cavity, thereby allowing the contacts 620, 625 to be presented to the conductive sea water. Sea water may make an electrical connection, and electrical continuity may thereby be achieved. Contact housing 630 houses a portion of contacts 620, 625. The contacts 620, 625 may be threaded into a thread cavity (not shown) in contact housing 630. O-rings 633 provide a seal around contact housing 630. Switch housing 645 is also shown. Switch 610 includes a rupture disk 650. The rupture disk 650 and shear plate 615 are deformed when the sea water rushes in.

FIG. 6B is a side view of the shear plate embodiment of switch 610. Illustrated are contacts 620, 625, O-rings 633, contact housing 630 and switch housing 645. FIG. 6C is a rear view of the shear plate embodiment. Shown here is the rear of diaphragm 650. Switch housing 645 is also shown.

As shown in FIG. 7A, illustrated is a resettable spring plunger embodiment of an electronic switch 710 in accordance with the present disclosure. Shown as part of switch 710 are an inner volume 715, contacts 720, 725, contact housing 730, O-rings 733, plunger 735, spring 736, O-rings 737, 738 and switch housing 745. As the differential pressure increases, the contacts 720, 725 connect with the contact block of plunger 735 after the differential pressure exceeds the force of spring 736. Physical contacts 720, 725 connect to the contact block of plunger 735 in order to signal that pressure has been reached. The contacts 720, 725 may be threaded into a thread cavity (not shown) in contact housing 730. In addition, other electronic contacts described herein may be threaded into a thread cavity. Contact housing 730 houses a portion of contacts 720, 725. O-rings 733 provide a seal around contact housing 730. Switch housing 745 is shown to the right of the illustration of FIG. 7A.

In FIG. 7A, the plunger 750 slides on the O-rings 760 to cause the contacts 720, 725 to make contact. The plunger 750 acts against the spring 736 to set the differential pressure when the contacts 720, 725 connect with the contact block of plunger 735 Plunger 35 slides on O-rings 737, 738.

FIG. 7B is a side view of the resettable spring plunger embodiment of switch 710. The contacts 720, 725, contact housing 730, O-rings 733 and switch housing 745 are shown. FIG. 7C is a rear view of the shear plate embodiment. Shown here is the switch housing 745, which forms walls around the distal end of plunger 735.

As shown in FIG. 8A, illustrated is a resettable moving diaphragm embodiment of an electronic switch in accordance with the present disclosure. As shown, the switch 810 has a moving diaphragm 815 which depresses with differential pressure. Contacts 820, 825 are shown. Contact housing 830 holds a portion of contacts 820, 825. O-rings 833 or other seals provide a seal around contact housing 830. Contact may be made between the conductive plunger 835 and contacts 820, 825 to form an electrical connection. The main housing 845 is also illustrated. The switch housing 845 forms side walls around the plunger 835. Rear wall section 850 connects main housing 845 with plunger 835.

FIG. 8B is a side view of the moving diaphragm embodiment. Illustrated are switch 810 and its components which are contacts 820, 825, contact housing 830, O-ring 833, and switch housing 845. FIG. 8C is a rear view of the shear plate embodiment which illustrates the switch housing 845 and plunger 835.

As shown in FIG. 9A, illustrated is a multiple contact embodiment of an electronic switch in accordance with the present disclosure. Shown is an inner volume 915, contacts 920, 925, contact housing 930, plunger 935, switch housing 945 and rear wall section 950. Using this multiple contact switch 910, two of the multiple contacts, e.g., contacts 920 may connect at a different time than the other two contacts 925. Each of the pair of contacts 920, 925 may be designed to connect at different pressures. The contacts 920 may be shorter than the contacts 925 and will therefore make connection with the plunger 940 at a higher differential pressure. Movement displacement may vary with depth, thereby allowing different contacts to be made as the payload descends or when external pressure increases. Contacts of varying depth may be connected with a resettable spring plunger design such as that described in FIGS. 7A-7C. The resettable spring plunger embodiment may also lend itself to sliding contacts in the bore which could momentarily connect associated lines as pressure passes a threshold and then as pressure decreases again, disconnect them. Contacts of varying depth may also be connected using a different configuration, e.g., the moving diaphragm shown in FIGS. 8A-8C. Contact housing 930 is sealed by O-rings 933, and holds a portion of contacts 920, 925. Switch housing 945 forms side walls around plunger 935.

As shown in FIG. 9A, multiple trigger points can be made in the same switch 910 and/or release mechanism by applying different contact regions or release point deflections to the active switch and/or release, or by compressing multiple contacts based on deflection of the switch and/or release. This can accommodate a pseudo-timed release of different features, such as an impact tube, ballast or parachute at different pressures.

FIG. 9B is a side view of the multiple contact embodiment of switch 910. The multiple contacts 920, 925 are shown. Also shown are contact housing 930, O-ring 933, and switch housing 945. FIG. 9C is a rear view of the shear plate embodiment. Shown here is the switch housing plunger 935 and wall area 935 that connects plunger 935, switch housing 945 and rear wall section 950.

Figure 10:
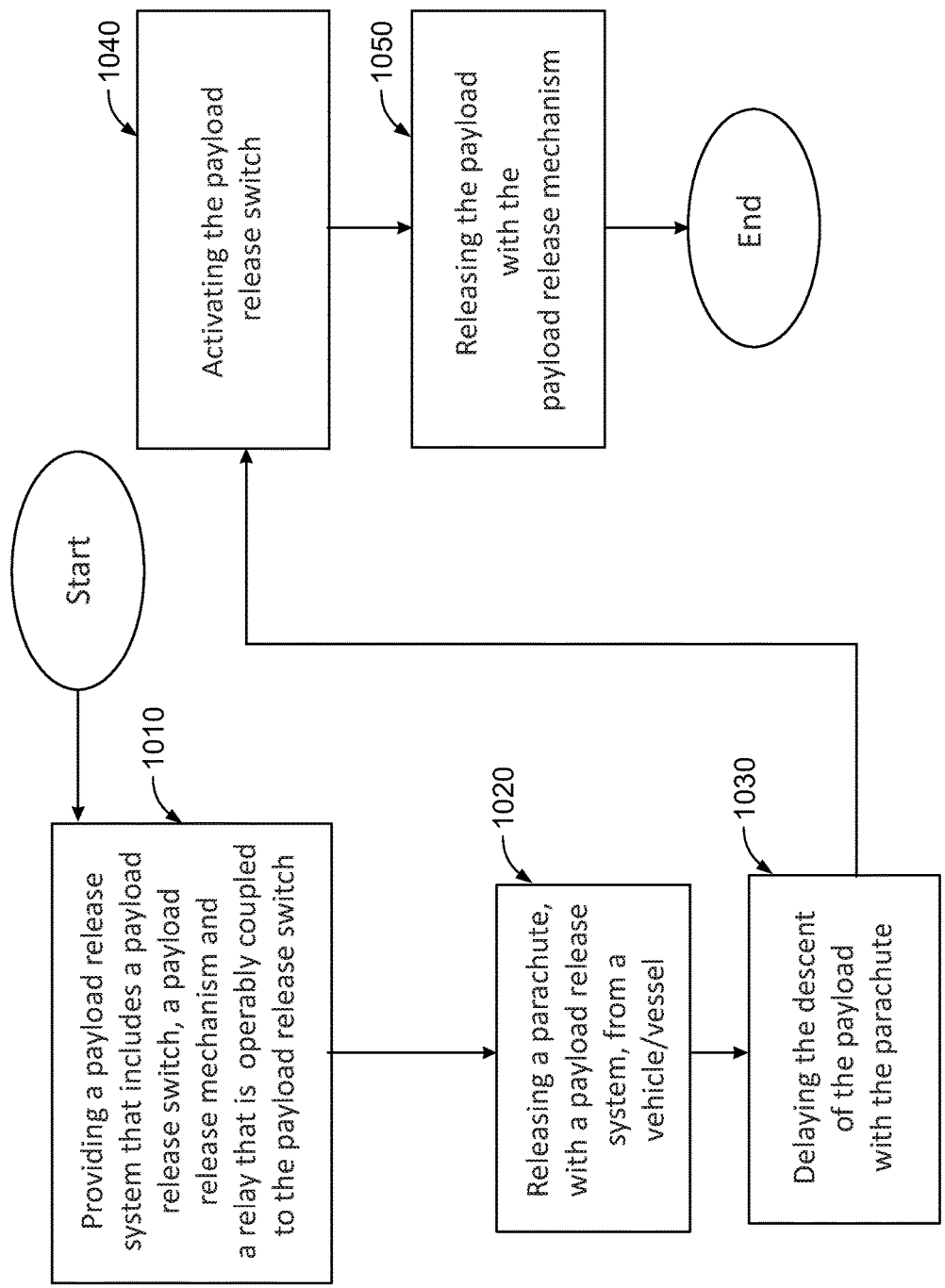
FIG. 10 illustrates the steps of a method for a pressure activated release of a payload in accordance with one embodiment of the present disclosure.

Referring now to FIG. 10, illustrated is one embodiment of a method for pressure activated release of payloads. At step 1010, a payload release system is provided. It includes a payload, a parachute, a payload release switch, a payload release mechanism, a power source and a relay that is operably coupled to the payload release switch. The payload release system and a parachute or other aerial deployment system may reside on a vehicle or vessel. At step 1020, a parachute may be released with the payload release system. At step 1030, the parachute may delay the descent of the payload. At step 1040, a payload release switch may be activated. At step 1050, the payload may be released by the payload release mechanism.

The release system and method described herein may be used with unmanned aerial vehicle (UAVs), and/or unmanned underwater vehicles (UUVs). Because these vehicles are unmanned, the release system and method described herein employs new release techniques for deployment of associated payloads that do not involve human intervention or maintenance. The release system described herein is also compact, lightweight and robust since the unmanned vehicles may themselves be small, lightweight and optimized. In addition, the portion of the payload that is dedicated to autonomous operation for deployment activity is also optimized.

The release system described herein can be used as a safety overpressure switch for processing plants, power plants, steam generators, and a variety of home use applications. For example, in one such home use application, the release system can be used as a governor for a pressure washer. The pressure activated release can also be used as a depth warning indicator switch, or chamber pressure trigger such as in safety locks for dive bells. Another embodiment could be a switch instead of a release that could warn divers of high pressure within the pressure vessel with an external light, say in the event of battery outgassing.

In aerospace applications, the pressure activated release can be used for an altitude warning switch, cabin depressurization indicator, as well as a cabin overpressure switch. Due to its inexpensive and robust design across its varying embodiments, the pressure activated release lends itself to many applications where pressure sensors have been otherwise impractical due to size, weight, cost, harsh environment, or power requirements.

The present release system has the advantage of being simple enough such that it can be made to be accurate, robust, and inexpensive with readily available commercial, off-the-shelf relays, springs, materials and/or power supplies, in a small, lightweight package without any programming or computerized circuitry. Due to its limited scope, it does not require external power for the sensor to function. Only in the electronic embodiments does it require power to activate the release.

Due to its limited function, the present release system can be scaled to meet system requirements for size and weight. Because of its simplicity and mechanical function it can give an accurate indication of pressure, and a very robust design can be made inexpensively. Another feature that sets the release system of the present disclosure apart from the commercially available products is that the present system can be made to work even if bio-fouled due to long term exposure to sea conditions owed to its varied design embodiments.

It will be understood that many additional changes in the details, materials, steps and arrangement of parts, which have been herein described and illustrated to explain the nature of the release system, may be made by those skilled in the art within the principle and scope of the invention as expressed in the appended claims.

We claim:

1. A pressure activated release system for deployment of a payload assembly, comprising:
    an aerial deployment subsystem comprising:
        an aerial payload release mechanism having an unreleased configuration at pressures below a first specified pressure, the aerial payload release mechanism having a released configuration at pressures above the first specified pressure; and
        an aerial payload release switch configured to be activated, without human intervention, by a first pressure differential, wherein the aerial payload release switch is configured to cause the aerial payload release mechanism to move from the unreleased configuration to the released configuration to deploy a first part of the payload assembly;
    a surface deployment subsystem comprising:
        a surface payload release mechanism having an unreleased configuration at pressures below a second specified pressure, the second payload release mechanism having a released configuration at pressures above the second specified pressure; and
        a surface payload release switch configured to be activated, without human intervention, by a second pressure differential, wherein the surface payload release switch is configured to cause the surface payload release mechanism to move from the unreleased configuration to the released configuration to deploy a second part of the payload assembly; and
    a subsea deployment subsystem comprising:
        a subsea payload release mechanism having an unreleased configuration at pressures below a third specified pressure, the subsea payload release mechanism having a released configuration at pressures above the third specified pressure; and
        a subsea payload release switch configured to be activated, without human intervention, by a third pressure differential, wherein the subsea payload release switch is configured to cause the subsea payload release mechanism to move from the unreleased configuration to the released configuration to deploy a third part of the payload assembly; and
    wherein the payload assembly includes a payload.

2. The release system of claim 1, further comprising:
    a relay that is operably coupled to a power source and at least one of the aerial payload release switch, the surface payload release switch, and the subsea payload release switch, the relay being configured to carry power to at least one of the aerial payload release mechanism, the surface payload release mechanism, and the subsea release mechanism.

3. The release system of claim 1, further comprising:
    a power source that is operably coupled to a relay, the power source being configured to activate the relay.

4. The release system of claim 1, wherein the aerial payload deployment subsystem includes:
    an aerial drag device configured to delay a descent of an aerial payload;
    wherein the aerial payload release mechanism is configured to permit release of the aerial drag device from a vehicle or vessel; and
    wherein the aerial payload release switch is configured to release the aerial drag device from the aerial payload.

5. The release system of claim 1, further comprising:
    a timer device configured to permit a timed release of the payload from a shock tube.

6. The release system of claim 1, wherein the third pressure differential activates the subsea payload release switch at a specified subsea depth; and
    wherein the subsea payload release mechanism is configured to release the payload at the specified subsea depth.

7. The release system of claim 1, wherein at least one of the aerial payload release mechanism, the surface payload release mechanism, and the subsea payload release mechanism is passively powered, and at least one of the aerial release mechanism, the surface release mechanism, and the subsea release mechanism is electrically triggered.

8. The release system of claim 1, wherein at least one of the aerial payload release mechanism, the surface payload release mechanism, and the subsea surface payload release mechanism is a pin that pulls from a slot.

9. The release system of claim 1, further comprising:
a containment device that contains the payload, and wherein the containment device is configured to protect the payload until the payload is released from the containment device.

10. The release system of claim 1, wherein at least one of the aerial payload release switch, the surface payload release switch, and the subsea payload release switch is selected from the group consisting of a shear plate switch, a resettable spring plunger switch, a resettable moving diaphragm switch and a multiple contact switch.

11. The release system of claim 1, wherein at least one of the aerial payload release mechanism, the surface payload release mechanism, and the subsea payload release mechanism is a resettable spring plunger or a resettable moving diaphragm.

12. The release system of claim 1, wherein the payload is an active sensor.

13. A release method for deployment of a payload assembly, the method comprising the steps of:
activating, without human intervention, an aerial payload release switch by a first pressure differential;
in response to activating the aerial payload release switch, releasing a first part of the payload assembly by an aerial payload release mechanism having an unreleased configuration at pressures below a first specified pressure, the aerial payload release mechanism having a released configuration at pressures above the first specified pressure;
activating, without human intervention, a surface payload release switch by a second pressure differential;
in response to activating the surface payload release switch, releasing a second part of the payload assembly by a surface payload release mechanism having an unreleased configuration at pressures below a second specified pressure, the surface payload release mechanism having a released configuration at pressures above the second specified pressure;
activating, without human intervention, a subsea payload release switch by a third pressure differential; and
in response to activating the subsea payload release switch, releasing a third part of the payload assembly by a surface payload release mechanism having an unreleased configuration at pressures below a third specified pressure, the subsea payload release mechanism having a released configuration at pressures above the third specified pressure.

14. The release method of claim 13, further comprising:
providing a relay that is operably coupled to a power source and at least one of the aerial payload release switch, the surface payload release switch, and the subsea payload release switch, the relay being configured to carry power to at least one of the aerial payload release mechanism, the surface payload release mechanism, and the subsea payload release mechanism.

15. The release method of claim 13, further comprising:
releasing an aerial drag device from a vehicle or vessel;
delaying a descent of an aerial payload with the aerial drag device; and
releasing the aerial drag device from the aerial payload by activating, without human intervention, the aerial payload release switch.

16. The release method of claim 15, further comprising:
after the step of releasing the aerial drag device, permitting the descent of the aerial payload to a subsea depth, therefore converting the aerial payload to a subsea payload.

17. A pressure activated release system for deployment of payload assembly, comprising:
an aerial deployment subsystem comprising:
an aerial payload release mechanism having an unreleased configuration at pressures below a first specified pressure, the aerial payload release mechanism having a released configuration at pressures above the first specified pressure; and
an aerial payload release switch configured to be activated, without human intervention, by a first pressure differential, wherein the aerial payload release switch is configured to cause the aerial payload release mechanism to move from the unreleased configuration to the released configuration to deploy a first part of the payload assembly;
a surface deployment subsystem comprising:
a surface payload release mechanism having an unreleased configuration at pressures below a second specified pressure, the second payload release mechanism having a released configuration at pressures above the second specified pressure; and
a surface payload release switch configured to be activated, without human intervention, by a second pressure differential, wherein the surface payload release switch is configured to cause the surface payload release mechanism to move from the unreleased configuration to the released configuration to deploy a second part of the payload assembly;
a subsea deployment subsystem comprising:
a subsea payload release mechanism having an unreleased configuration at pressures below a third specified pressure, the subsea payload release mechanism having a released configuration at pressures above the third specified pressure; and
a subsea payload release switch configured to be activated, without human intervention, by a third pressure differential, wherein the subsea payload release switch is configured to cause the subsea payload release mechanism to move from the unreleased configuration to the released configuration to deploy a third part of the payload assembly; and
a relay that is operably coupled to a power source and at least one of the aerial payload release switch, the surface payload release switch, and the subsea payload release switch, the power source being configured to activate the relay, and the relay being configured to carry power to at least one of the aerial payload release mechanism, the surface payload release mechanism, and the subsea payload release mechanism;
and
wherein the payload assembly includes a payload.

18. The release system of claim 17 wherein the aerial payload deployment subsystem includes:
an aerial drag device configured to delay a descent of an aerial payload;
wherein the aerial payload release mechanism is configured to permit release of the aerial drag device from a vehicle or vessel; and
wherein the aerial payload release switch is configured to release the aerial drag device from the aerial payload.

19. The release system of claim 18, wherein at least one of the aerial payload release switch, the surface payload release switch, and the subsea surface release switch is selected from the group consisting of a shear plate switch, a resettable spring plunger switch, a moving diaphragm switch and a multiple contact switch.

* * * * *